US005695636A

United States Patent [19]
Gullett

[11] Patent Number: 5,695,636
[45] Date of Patent: Dec. 9, 1997

[54] FLUID FILTER HAVING A REUSABLE FILTER HOUSING AND A REPLACEABLE FILTER ELEMENT

[75] Inventor: David F. Gullett, Peoria, Ill.

[73] Assignee: Caterpillar Inc., Peoria, Ill.

[21] Appl. No.: 596,392

[22] Filed: Jan. 31, 1996

[51] Int. Cl.⁶ .................................................. B01D 35/30
[52] U.S. Cl. .......................... 210/232; 210/248; 210/440; 210/444; 210/450; 210/453; 210/455
[58] Field of Search ...................... 210/168, 232, 210/437, 440, 441, 443, 444, 450, 453, 457, 455, 248

[56] References Cited

U.S. PATENT DOCUMENTS

| 5,342,519 | 8/1994 | Friedmann et al. | 210/232 |
|---|---|---|---|
| 5,538,626 | 7/1996 | Baumann | 210/232 |
| 5,548,893 | 8/1996 | Koelfgen | 210/444 |

FOREIGN PATENT DOCUMENTS 2326212  12/1974  Germany .................. 210/DIG. 17

*Primary Examiner*—Matthew O. Savage
*Attorney, Agent, or Firm*—Pankaj M. Khosla

[57] ABSTRACT

A reusable fluid filter assembly is provided, comprising, a cylindrical housing having external threads adjacent its open end; a top plate assembly having internal threads and indexing means for preventing rotation of the top plate with respect to a filter mounting base after the filter is positioned; a top plate attachment member having a fluid exit port extending through it and internal threads for threading onto corresponding external threads on the filter mounting base; and a replaceable filter element. A sealing ring in an annular channel adjacent the external threads of the housing seals the filter assembly when the housing is threaded into the top plate. The top plate attachment member secures the top plate assembly to the filter mounting base and also seals against the open end of the filter element.

23 Claims, 5 Drawing Sheets

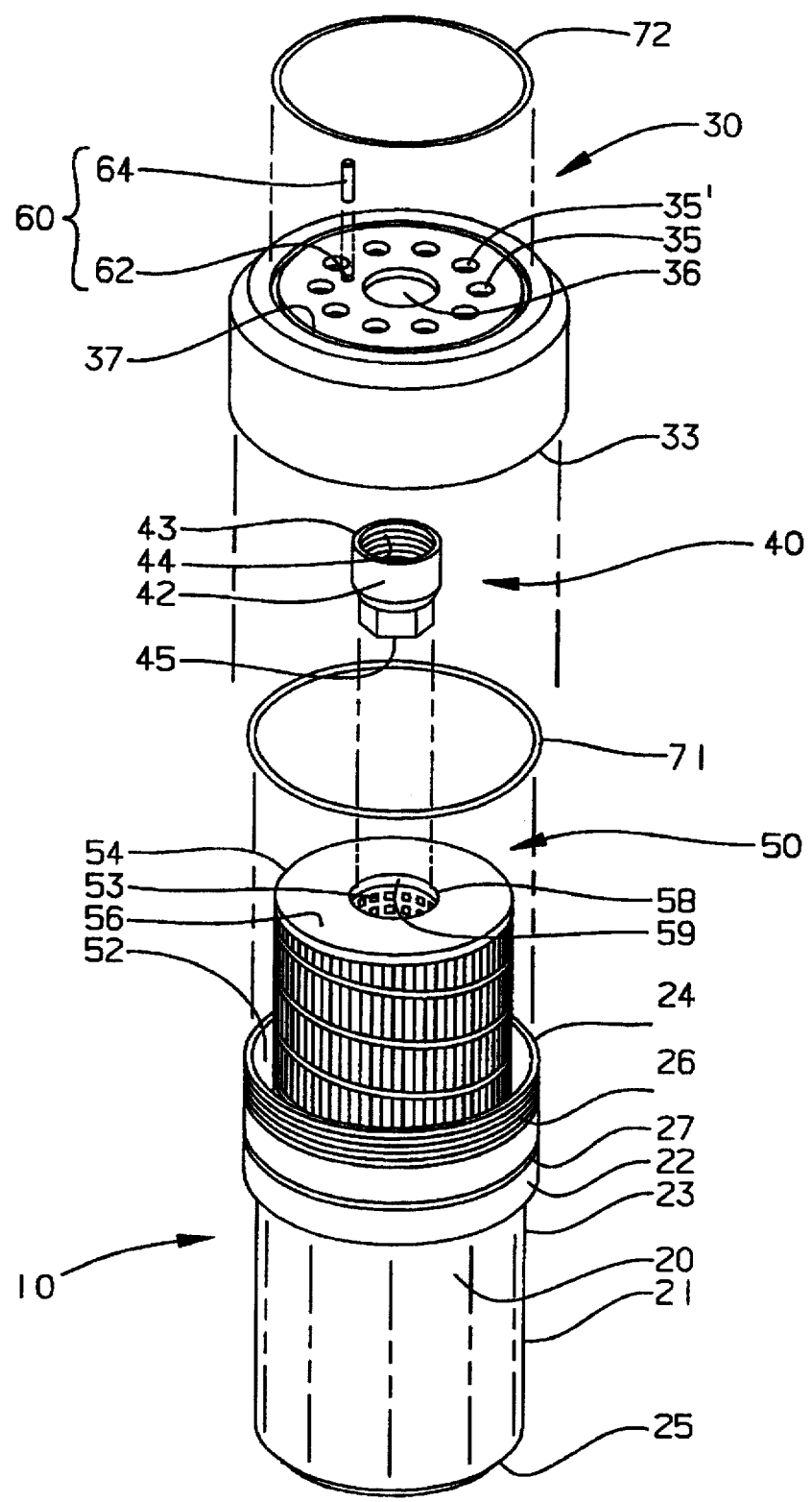

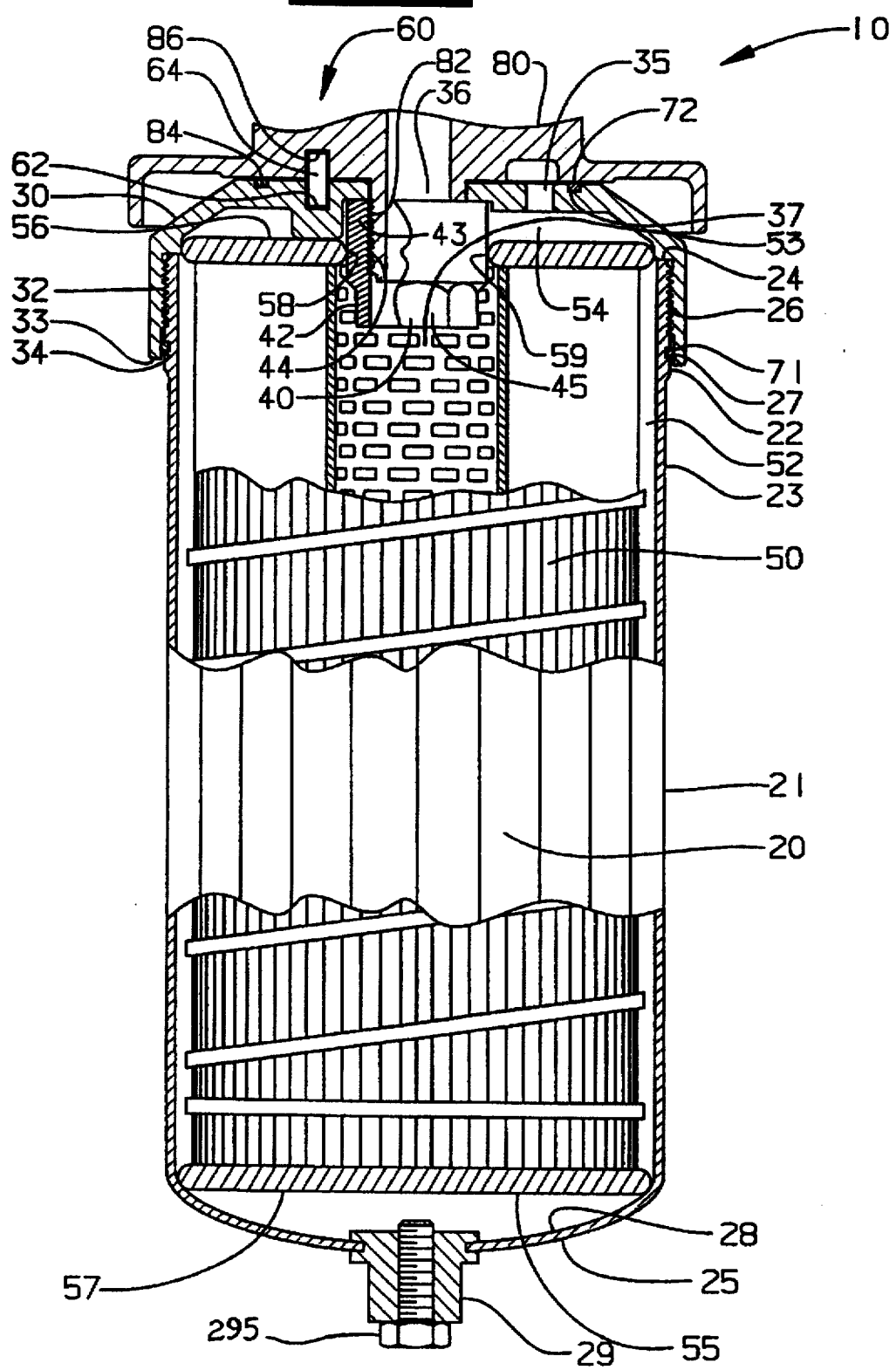

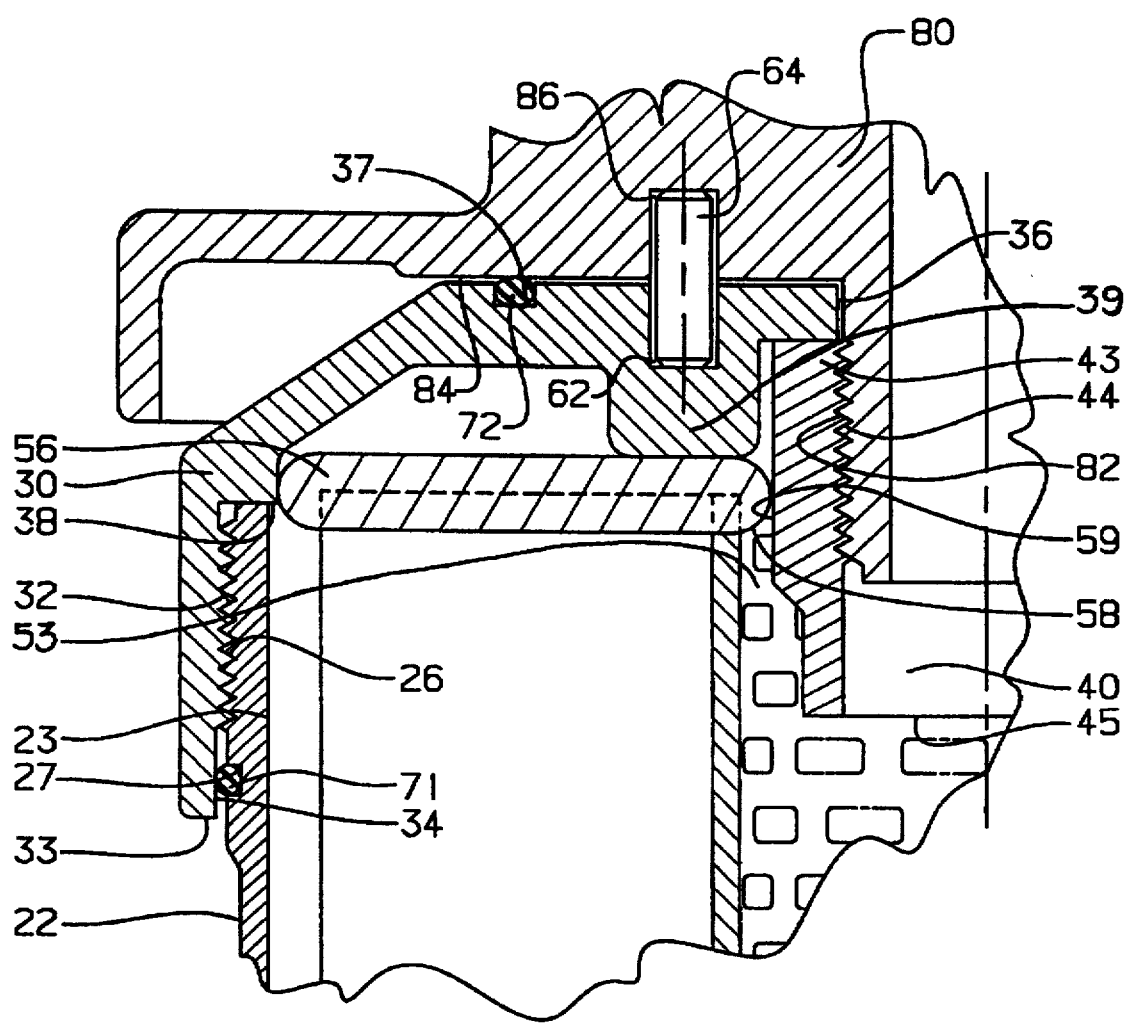
Fig_3_

Fig_4_
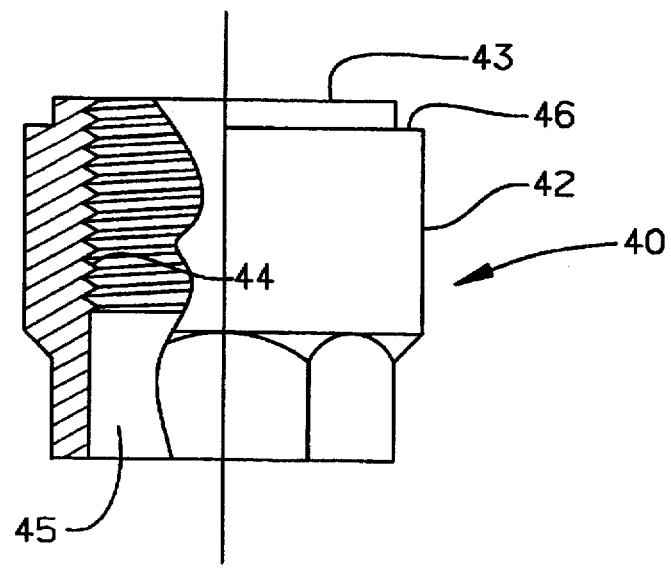
Fig_5_
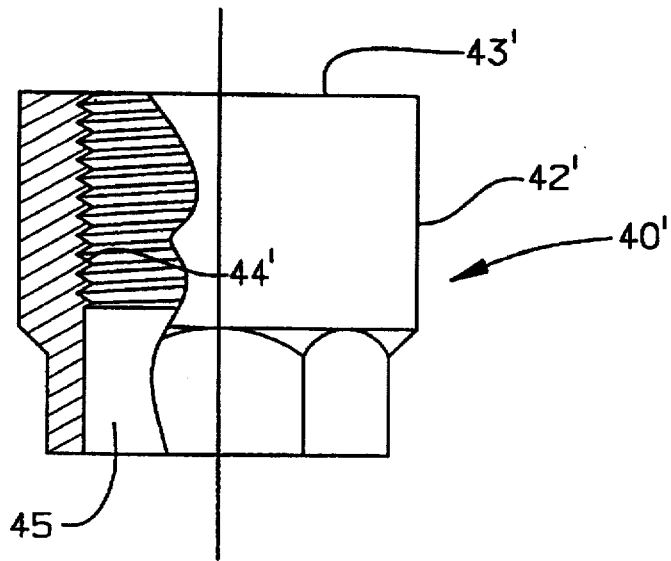

Fig_6_
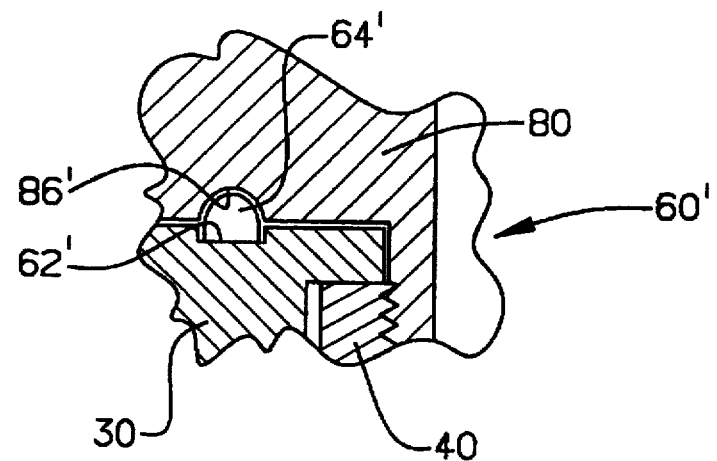
Fig_7_
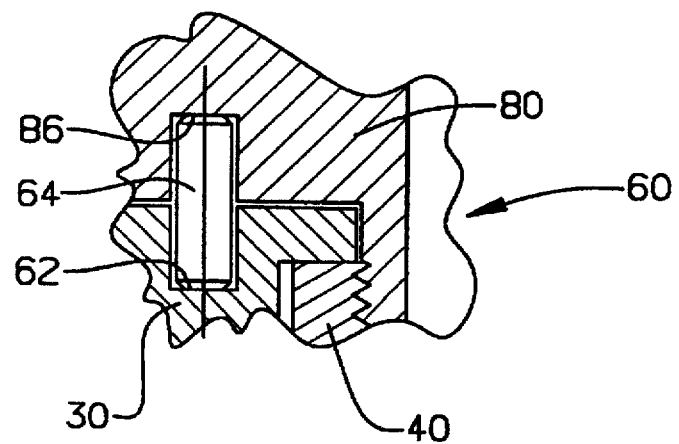

FLUID FILTER HAVING A REUSABLE FILTER HOUSING AND A REPLACEABLE FILTER ELEMENT

TECHNICAL FIELD

The present invention relates generally to fluid filters, and more particularly to a spin-on type fluid filter having a reusable filter housing with a lockable top plate, and a replaceable filter element.

BACKGROUND ART

Filter assemblies for filtering liquids such as engine oil, hydraulic oil and fuel are well known in the art. An oil filter assembly is typically installed in the oil lines of an internal combustion engines to remove grit and other contaminants from the engine lubricating oil to provide a longer engine life and improved engine performance.

A typical oil filter assembly has a housing which contains a filter element used for filtering the oil as it circulates through the housing. The housing ordinarily has a first end adapted for coupling the filter assembly to the engine block of the internal combustion engine by means of an internally threaded fluid exit port that threads onto a corresponding externally threaded configuration on the engine block. The housing also has a second end which is ordinarily closed. The fluid exit port is ordinarily centrally located in a housing cover which is permanently, peripherally attached to the first end of the housing. Contaminated oil flows into the filter housing through fluid inlet holes located in the cover and surrounding the fluid exit port, and clean, filtered oil flows out of the filter housing through fluid exit port. The filter housing is sealed against the engine block by using an elastomeric gasket which surrounds the inlet holes and the exit port. Fluid filters with such an attachment configuration are generally referred to in the art as "spin-on" type filters.

Disposable or "throw away" type fluid filters are known in the art. The filter element is permanently sealed inside the filter housing. When the filter element has become clogged, the entire filter assembly is removed and discarded and a new filter assembly is put in its place. This type of a filter represents a waste of natural resources, labor and materials because an entirely new filter assembly must be used each time the old filter assembly is serviced, even though its only the filter element that has been expended and the other parts of the filter, such as the housing, top plate and seals have not yet exceeded their useful life.

An oil filter assembly having a detachable cover and housing to permit the replacement of the filter element is also known in the art. U.S. Pat. No. 5,342,519 discloses such a filter assembly. However, such a design has practical limitations because the detachable cover is attached to the engine block in a conventional manner, i.e., via a centrally positioned internally threaded exit port located in the cover which threads onto a corresponding externally threaded nipple located on the engine block. To secure such a filter assembly to the engine block, either the entire filter assembly, or at least the cover, must be rotated in one direction until the filter assembly seals against the engine block. When the filter assembly is to be serviced, the housing is counter-rotated to separate it from the cover. However, in most instances, the cover separates from the engine block due to the counter-rotating force applied to the housing, rather than the housing separating from the cover. This causes the dirty oil to spill out of the filter housing which represents an environmental and safety hazard. Another step of separating the cover from the housing must be performed in order to remove the expended filter element. Further, each time the cover separates from the engine block, a new elastomeric seal must be installed in place of the old one. In an attempt to alleviate this problem, if the cover is tightened against the engine block excessively, the elastomeric seal is subjected to excessive compression, causing sealability problems. All of these practical limitations result in a waste of time, labor and natural resources and also raise environmental and operator safety concerns.

It has been desirable to have a fluid filter having a reusable filter housing and a replaceable filter element that does not present any of the above mentioned practical problems. It has been desirable to have a reusable filter housing design that allows for environmentally safe collection and disposal of the dirty oil and also allow for safe removal of the replaceable filter element. It has been particularly desirable that when the filter element is to be replaced, only the housing separate from the cover, and not the cover from the engine block. It has further been desirable that the cover be sealable against the engine block without over-compressing the elastomeric seal.

The present invention is directed to overcome one or more problems of the heretofore utilized replaceable filter element and reusable filter housing assemblies.

DISCLOSURE OF THE INVENTION

In one aspect of the present invention, a reusable fluid filter assembly is provided. The reusable fluid filter assembly comprises a cylindrical housing having an annular peripheral wall, an open end and a closed end. The housing has external threads adjacent the open end and an annular channel adjacent the external threads. A first sealing ring is disposed in the annular channel.

The filter assembly also comprises a top plate assembly having internal threads for mating with the external threads adjacent the open end of the housing and peripheral sealing surface means adjacent the internal threads. The top plate assembly also has a rim, and fluid inlet means and fluid outlet means extending through the top plate assembly. The top plate assembly further has indexing means for preventing rotation of the top plate with respect to a filter mounting base after the top plate has been secured to the filter mounting base.

The filter assembly further comprises a top plate attachment member having a tubular shape and an outer surface. The top plate attachment member has a pilot end having internal threads for threading onto corresponding external threads on the filter mounting base. The top plate attachment member further has a fluid outlet port extending through it.

The filter assembly still further comprises a replaceable filter element disposed in the housing. The filter element defines a fluid inlet chamber between the filter element and the housing. The filter element has a hollow cylindrical core which opens to a first end of the filter element, allowing filtered fluid to flow therefrom. The filter element also has a closed second end and an outer diameter that is smaller than the inner diameter of the housing. The smaller outer diameter facilitates removal of the filter element through the open end of the housing.

In the reusable fluid filter assembly, the first sealing ring forms a first seal in cooperation with the peripheral sealing surface means adjacent the internal threads of the top plate when the external threads of the housing are threaded into the internal threads of the top plate assembly.

The fluid inlet means of the top plate are in fluid communication with the fluid inlet chamber defined by the space between the filter element and the housing.

The top plate attachment member extends into the open end of the filter element. The fluid outlet port of the top plate attachment member is in fluid communication with the hollow cylindrical core of the filter element. The outer surface of the attachment member sealingly engages the open end of the filter element.

BRIEF DESCRIPTION OF THE DRAWINGS

FIG. 1 is an exploded perspective view of a reusable fluid filter assembly including a cylindrical housing, a top plate assembly, a top plate attachment member and a replaceable filter element, according to one embodiment of the present invention;

FIG. 2 is a diagrammatic side view of the reusable fluid filter assembly shown in FIG. 1 when assembled, a portion thereof being shown in section and a portion thereof being broken away;

FIG. 3 is an enlarged portion of FIG. 2, showing the threaded attachment of the cylindrical housing to the top plate assembly, the indexing means for preventing relative rotation of the top plate with respect to the filter mounting base, and the top plate attachment member threaded in position onto the filter mounting base, according to the preferred embodiment of the present invention;

FIG. 4 is a diagrammatic side view of the top plate attachment member, a portion thereof being shown in section, according to one embodiment of the present invention;

FIG. 5 is a diagrammatic side view of the top plate attachment member, a portion thereof being shown in section, according to a preferred embodiment of the present invention;

FIG. 6 is a diagrammatic sectional side view of the indexing means disposed in a recess in the top plate and the filter mounting base when the filter assembly is in position, according to one embodiment of the present invention; and FIG. 7 is a diagrammatic sectional side view of the indexing means disposed in a recess in the top plate and the filter mounting base when the filter assembly is in position, according to the preferred embodiment of the present invention.

BEST MODE FOR CARRYING OUT THE INVENTION

Referring to FIG. 1, an exploded perspective view of a reusable fluid filter assembly 10 is shown, which includes a cylindrical housing 20, a top plate assembly 30, a top plate attachment member 40, and a replaceable filter element 50, according to one embodiment of the present invention. While the preferred embodiment is intended for use as an engine oil filter for internal combustion engines, the filter could be used for a variety of different applications, depending upon the type of filtration media used, for filtering fluids, such as hydraulic oil, fuel, and water.

The cylindrical housing 20 has an annular peripheral wall 21, an open end 24 and a closed end 25. The housing 20 has external threads 26 adjacent the open end 24 and an annular channel 27 adjacent the external threads 26. A first sealing ring 71 is disposed in the annular channel 27. Housing 20 has a first wall portion 22 and a second wall portion 23. In one embodiment, the first wall portion 22 starts at the open end 24 of the housing 20 and extends for an axial length, desirably no greater than about one-third the outer diameter of the housing 20. The thickness of the first wall portion 22 is desirably, at least 50% greater than the thickness of the second wall portion 23 because external threads 26 are present on the first wall portion 22 and thus, the greater wall thickness gives the first wall portion greater mechanical strength. In the preferred embodiment, the first wall portion 22 starts at the open end 24 of the housing 20 and extends for an axial length, desirably no greater than about 50 mm, and preferably, no greater than about 40 mm. In the preferred embodiment, the housing 20 is fabricated as a single unit from stainless steel by deep drawing and spinning techniques which are well known to those skilled in the art. Other materials and manufacturing techniques may be employed, for example, a molded plastic housing may be fabricated. In the preferred embodiment, the first wall portion 22 has a thickness, desirably in the range of about 3 mm to about 4 mm and preferably, about 3.5 mm and the second wall portion 23 has a thickness, desirably in the range of about 1 mm to about 2 mm, and preferably, about 1.5 mm. A first wall portion thickness less than 3 mm is undesirable because if the wall is too thin and after external threads are machined therein, the structural integrity of the stainless steel housing and the repeatability of its use would be compromised. Similarly, a second wall thickness less than about 1 mm is undesirable from a structural integrity and durability standpoint. A first wall portion thickness greater than about 4 mm and a second wall thickness greater than about 2 mm is undesirable because it presents practical limitations on the fabrication of the housing and also represents a waste of labor and materials as far as the intended use of the preferred embodiment is concerned. However, in certain applications, one may find it necessary to use an even greater wall thickness, especially for extremely large sized filter assemblies.

The annular channel 27 in housing 20, as shown in FIG. 2 and FIG. 3 is adjacent the external threads 26 and has a first sealing ring 71 disposed in it. In the preferred embodiment, the annular channel 27 has a rectangular shape. This shape can however be square, circular or polygonal depending upon the type of sealing ring used. In the preferred embodiment, the first sealing ring 71 has a circular cross section and is made from an injection molded elastomeric material, desirably a nitrile rubber. The sealing ring may have other cross section geometries and may be made from a variety of different elastomers, such as hydrogenated nitrile rubber, for example, depending on the desired elastomer properties such as heat resistance, low compression set and/or low brittle point.

Housing 20 also includes a centrally located drain plug housing 29 permanently fixed, by means such as welding, to the closed end 25 of housing 20, as illustrated in FIG. 2. Drain plug housing 29 includes a threaded drain plug 295 therein. Drain plug housing 29 has an outer surface having the shape of a square or a hexagon to enable it to be gripped by a tool, such as a wrench. Housing 20 can be threaded on or off top plate 30 by rotating it with a tool engaged with the drain plug housing 29.

The top plate assembly 30 has a circular shape and has internal threads 32 for mating the external threads 26 of the housing 20 and peripheral sealing surface means 34 adjacent the internal threads 32. The top plate assembly 30 also has a rim 33, and fluid inlet means 35,35', (hereinafter referred to as 35) and fluid outlet means 36 extending through the top plate assembly. The top plate assembly 30 has indexing means 60 for preventing rotation of the top plate 30 with respect to a filter mounting base 80 after the top plate has been secured to the filter mounting base. The first sealing ring 71 forms a first seal in cooperation with the peripheral sealing surface means of the top plate 30 when the external threads 26 of the housing 20 are threaded into the internal threads 32 of the top plate 30. In the preferred embodiment, the peripheral sealing surface means include a peripheral sealing surface 34, as shown in FIG. 3, located between the internal threads 32 and the rim 33 of the top plate 30. Preferably, the first sealing ring 71 disposed in the annular channel 27 of the cylindrical housing 20 is biased against the sealing surface 34 to create the first seal.

As illustrated in FIG. 2 and FIG. 3, in the preferred embodiment of the present invention, the indexing means 60 include a recess 62 in the top plate 30. The recess is adapted to desirably receive means such as a pin, cog or a key for mating with a corresponding recess in the mounting base. The recess 62 is preferably adapted to receive a guide pin 64 for mating with a corresponding recess 86 in the filter mounting base 80. The guide pin 64 is fitted in the top plate recess 62 and the filter mounting base recess 86 when the top plate 30 is sealably attached to the filter mounting base 80.

As illustrated in FIG. 6, in the preferred embodiment, the guide pin is preferably a cylindrical rod, and the top plate recess and filter mounting base recess are both cylindrical bores, respectively. In one embodiment, the guide pin has a diameter of about 5 mm and a length of about 20 mm. These dimensions can be changed according to the overall dimensions of the top plate and the filter assembly. The top plate bore has a length of about 10 mm and a diameter sufficient for interference fitting the guide pin therein. Preferably, the top plate bore has a diameter that is about 0.03 mm to about 0.08 mm greater than the guide pin diameter to facilitate a interference fit. The guide pin is press-fitted into said top plate bore so that the pin is held rigidly in the top plate and protrudes from the surface of the top plate by a length of about 10 mm. The corresponding recess in the mounting base 80 preferably has a diameter that is about 0.10 mm to about 0.50 mm greater than the guide pin diameter, to facilitate the guide pin to slip-fit into the recess. An alternate indexing means 60 is illustrated in FIG. 6, showing a semi-circular key 64' located in a recess 62' in the top plate 30 and a corresponding recess 86' in the filter mounting base 80.

The top plate 30 also includes a centrally located fluid outlet opening 36, as illustrated in FIGS. 1, 2 and 3, sized to slip fit onto the external threads 82 on the filter mounting base 80. Desirably, the opening 36 has a diameter which is no more than about 3 mm greater than the diameter of the threads 82, and preferably about 1.5 mm greater. If the opening 36 is too large, the filter assembly will tend to shift with respect to the filter mounting base and the sealability of the filter assembly to the base will be detrimentally compromised.

In the preferred embodiment, top plate 30 has a circumferential annular channel 37 surrounding the fluid outlet opening 36 as illustrated in FIG. 1 and FIG. 3. The annular channel 37 has a second sealing ring 72 disposed therein. Preferably, the sealing ring 72 has a circular cross section and is made from an injection molded elastomeric material, desirably a nitrile rubber. The sealing ring may have other cross section geometries and may be made from a variety of different elastomers, such as hydrogenated nitrile rubber, for example, depending on the desired elastomer properties such as heat resistance, low compression set and/or low brittle point. In the preferred embodiment, the sealing ring 72 has a diameter in the range of about 2 mm to about 4 mm. Further, in the preferred embodiment, the second sealing ring 72 is biased against the circumferential sealing surface means 84 of the mounting base 80 to create a second seal when the top plate 30 is urged towards the base 80.

The top plate 30 also includes means for preventing excessive tightening of the housing 20 to the top plate 30 and for indicating positive sealing when the housing is threaded into the top plate. Preferably, as shown in FIG. 3, the means include a mechanical stop 38 formed on the top plate. The mechanical stop 38 provides a mechanical contact between the top plate assembly and the open end of the cylindrical housing. A plurality of ribs 39 are provided on the inner surface of the top plate 30. The ribs 39 have a length oriented in a radial direction and have a depth oriented in the axial direction, as shown in FIG. 3.

The top plate attachment member 40 has a tubular shape, an outer surface 42, a pilot end 43 having internal threads 44 for threading onto corresponding external threads 82 on the filter mounting base 80, and a fluid outlet port 45 extending through the attachment member 40. Referring to FIG. 4 which illustrates an embodiment of the present invention, the member 40 has a pilot diameter, an outer diameter, and a shoulder 46 formed between the pilot diameter and the outer diameter. In this embodiment, the top plate fluid outlet opening 36 has an inner diameter sized to fit loosely around external threads 82 on filter mounting base 80. The pilot diameter of member 40 is desirably of a size sufficient to slip fit inside the inner diameter of the top plate fluid outlet 36 and preferably, about 0.10 mm to 0.50 mm smaller than the inner diameter of outlet 36. The shoulder 46 of member 40 presses against the top plate 30, forming a mechanical contact, and pushes the top plate against the mounting base 80 when the internal threads 44 of the member 40 are threaded into the external threads 82 of base 80.

In the preferred embodiment, as shown in FIG. 5, the attachment member 40' has an outer surface 42', inner threads 44', and a fluid outlet port 45'. The outer surface diameter of member 40' is greater than the diameter of top plate outlet 36 to facilitate a good mechanical contact with the top plate. Preferably, the outer surface diameter of member 40' is at least about 1.5 mm greater than the diameter of outlet 36. In the preferred embodiment, the end 45 of attachment member 40 has a surface adapted for being turned by a tool, such as a ratchet wrench or an Allen wrench. As illustrated in FIG. 4 and FIG. 5, such a surface is preferably the outer surface having a hexagonal configuration. It should be recognized however, that a variety of other shapes, such as a square or a polygon could be employed and these shapes could be formed on the inner surface of the end 45 as well.

The replaceable filter element 50 is disposed in housing 20 to define a fluid inlet chamber 52 between the filter element and the housing. The filter element 50 includes a hollow cylindrical core 53 which opens to a first end 54, and a closed second end 55. The first end 54 allows filtered fluid to flow through it. The filter element 50 preferably has an outer diameter that is smaller than the inner diameter of housing 20 to allow removal of the filter element 50 through the open end 24 of the housing. The filter media can be made from a variety of materials, such as paper or synthetic fibers, for example. The filter element has an annular end cap 56 on the open end 54, a imperforate end cap 57 on the closed end 55. The endcaps 56,57 are made from elastomeric materials. Preferably, endcaps 56,57 are made from polyurethanes having a hardness in the range of about 70 Shore A to 85 Shore A durometer. End cap 56 has a resilient inner edge 58 defined by an opening in the end cap to the hollow cylindrical core. The resilient inner edge provides a sealing surface 59.

In the preferred embodiment, when the filter element is snugly fitted onto the attachment member 40, the sealing surface 59 of element 50 is biased against the outer surface 42 of member 40 and provides a radial seal with surface 42 of member 40. In this position, member 40 extends into the open end 54 of the filter element. The fluid outlet port 45 of member 40 is also in fluid communication with the hollow cylindrical core 53. Also, the surface of endcap 56 is biased against the ribs 39 on the inner surface of the top plate. This helps the filter element to fit snugly onto the top plate and the top plate attachment member. Further, in this position, the fluid inlet holes 35,35' in top plate 30 are in fluid communication with the fluid inlet chamber 52. When the housing is threaded onto the top plate, the imperforate endcap 57 on the closed end of the filter is biased against the interior surface 28 of the closed end 25 of the housing. This helps the filter element to fit snugly inside the housing and helps maintain a constant geometry of the fluid inlet chamber 52. Preferably, the imperforate endcap has a plurality of integrally molded urethane tabs that bias against the housing surface 28. In the preferred embodiment, there are three integrally molded tabs on endcap 57.

It should be understood that the present invention is not limited to the preferred embodiment. One skilled in the art may make changes to the size, shape and material of construction of the components within the principles of this invention and to the extent provided by the broad meaning of the appended claims.

Industrial Applicability

The fluid filter assembly 10 is assembled in the following manner. The top plate assembly 30, having an indexing guide pin 60, is mounted on the filter mounting base 80 attached to, say, the engine block, by threading the top plate attachment member 40 to corresponding threads on base 80. Then filter element 50 is mounted on attachment member 40 and the open end of the resilient urethane endcap of the filter element seals against the tubular surface of member 40. The housing 20 is then treaded onto top plate 30 by hand and then tightened by a tool engaged around the drain plug housing 29.

The sealing between the top plate and the mounting base occurs by a nitrile rubber seal 72. The sealing between the top plate and the housing occurs by a nitrile rubber seal 71.

The top plate 30 and top plate attachment member 40 both remain attached to the mounting base on, say, the engine block. Any clockwise or anti-clockwise rotational movement of the top plate with respect to the mounting base is prevented by the indexing pin.

The contaminated and dirty engine oil enters the filter assembly through the fluid inlet holes 35,35' and flows into the fluid inlet chamber 52. The fluid is filtered as it passes radially inward from the fluid inlet chamber 52, through the filtration media, and through the perforations in the perforated center tube 51 of the filter element 50, to the hollow cylindrical core 53. The filtered oil flows through the top plate attachment member 40, through the top plate outlet 36 and exits the filter assembly 10.

When the filter has to be serviced, the used oil is first drained through the drain plug housing 29 after removing the plug 295, into an environmentally safe disposable container. When the oil has been fully drained from the filter assembly, the housing is rotated and loosened from the top plate. The filter element is replaced with a new one, and a new seal 71 is installed prior to re-threading the housing to the top plate.

The present invention is particularly useful for making oil filters for internal combustion engines used in off-highway trucks, construction equipment, marine applications, power generation equipment, buses, general freight trucks and upper-end recreational vehicles. The present invention is also useful for making hydraulic fluid filters for use in the hydraulic systems of various earth-moving and construction equipment, as well as fuel filters.

Other aspects, objects and advantages of this invention can be obtained from a study of the drawings, the disclosure and the appended claims.

I claim:

1. A reusable fluid filter assembly for mounting on a mounting base, comprising:

a cylindrical housing having an annular peripheral wall, an open end, a closed end, external threads adjacent said open end, an annular channel adjacent said external threads, and a first sealing ring disposed in said annular channel;

a top plate assembly having internal threads for mating with said external threads adjacent said open end of said housing, peripheral sealing surface means adjacent said internal threads, a rim, fluid inlet means and fluid outlet means extending through said top plate assembly, and indexing means for preventing rotation of said top plate with respect to a filter mounting base after said top plate has been secured to said filter mounting base;

a top plate attachment member having a tubular shape, and outer surface, a pilot end having internal threads for threading onto corresponding external threads on said filter mounting base, and a fluid outlet port extending through said attachment member;

a replaceable filter element disposed in said housing to define a fluid inlet chamber between said filter element and said housing, said filter element having a hollow cylindrical core defined by a perforated center tube, said center tube being separate from said top plate attachment member, said hollow cylindrical core opening to an open first end of said filter element, allowing filtered fluid to flow therefrom, and having a closed second end, said filter element having an outer diameter that is smaller than an inner diameter of said housing to allow removal of said filter element through the open end of said housing, said replaceable filter element further has an annular end cap on said open first end, an imperforate end cap on said closed second end, said annular and imperforate end caps being made from elastomeric materials, said annular end cap is biased against ribs of said top plate, and said imperforate end cap is biased against an interior surface of the closed end of said housing;

said first sealing ring forming a first seal in cooperation with said peripheral sealing surface means adjacent said internal threads of said top plate when said external threads of said housing are threaded into said internal threads of said top plate assembly;

said fluid inlet means of said top plate being in fluid communication with said fluid inlet chamber defined by said filter element and housing; and said top plate attachment member extending into said open first end of said filter element, said fluid outlet port of said top plate attachment member being in fluid communication with said hollow cylindrical core of said filter element, and said outer surface of said attachment member sealingly engaging said open first end of said filter element.

2. A fluid filter assembly, as set forth in claim 1, wherein said indexing means include a recess in said top plate, said recess being adapted to receive a guide pin for mating with a corresponding recess in said filter mounting base.

3. A fluid filter assembly, as set forth in claim 2, wherein said guide pin is fitted in said top plate recess and said filter mounting base recess when said top plate is sealably attached to said filter mounting base.

4. A fluid filter assembly, as set forth in claim 3, wherein said guide pin is a cylindrical rod, and said top plate and filter mounting base recesses are cylindrical bores.

5. A fluid filter assembly, as set forth in claim 4, wherein said guide pin has a diameter of about 5 mm and a length of about 20 mm, said top plate bore has a length of about 10 mm and a diameter sufficient for press fitting said guide pin therein, said guide pin being interference-fitted into said top plate bore.

6. A fluid filter assembly, as set forth in claim 1, wherein the fluid outlet means of said top plate include a centrally located fluid outlet opening sized to slip fit onto the external threads on said filter mounting base.

7. A fluid filter assembly, as set forth in claim 6, wherein said top plate attachment member has an outer diameter larger than the fluid outlet opening of said top plate.

8. A fluid filter assembly, as set forth in claim 1, wherein the fluid outlet means of said top plate include a centrally located circular fluid outlet opening having an inner diameter sized to fit around the external threads on said filter mounting base.

9. A fluid filter assembly, as set forth in claim 8, wherein said top plate attachment member has a pilot diameter, an outer diameter, and a shoulder formed between said pilot diameter and said outer diameter, said pilot diameter being of a size sufficient to slip fit inside the inner diameter of said fluid outlet opening of said top plate, and said shoulder forming a mechanical contact with said top plate when the internal threads of the pilot end of said attachment member are threaded into the corresponding external threads on said filter mounting base.

10. A fluid filter assembly, as set forth in claim 1, wherein said top plate assembly is urged towards said filter mounting base when said top plate attachment member is secured to said filter mounting base.

11. A fluid filter assembly, as set forth in claim 1, wherein said top plate has a circumferential annular channel surrounding said fluid outlet opening.

12. A fluid filter assembly, as set forth in claim 11, wherein said annular channel has a second sealing ring disposed therein.

13. A fluid filter assembly, as set forth in claim 12, further comprising said filter mounting base, wherein said filter mounting base has circumferential sealing surface means to correspond with said second sealing ring.

14. A fluid filter assembly, as set forth in claim 13, wherein the second sealing ring disposed in the circumferential annular channel of said top plate is biased against said circumferential sealing surface means of said filter mounting base to create a second seal when top plate assembly is urged towards said filter mounting base.

15. A fluid filter assembly, as set forth in claim 1, wherein said peripheral sealing surface means include a sealing surface located between said internal threads and said rim of said top plate.

16. A fluid filter assembly, as set forth in claim 15, wherein said first sealing ring disposed in said annular channel of said cylindrical housing is biased against said sealing surface of said top plate to create said first seal.

17. A fluid filter assembly, as set forth in claim 1, including means for preventing excessive tightening of said housing to said top plate and indicating positive sealing when said housing is threaded into said top plate, said means including a mechanical stop formed on said top plate, said mechanical stop providing a mechanical contact between said top plate assembly and said open end of said cylindrical housing.

18. A fluid filter assembly, as set forth in claim 1, wherein said annular end cap has a resilient inner edge defined by an opening in said end cap to said hollow cylindrical core, said resilient inner edge providing a sealing surface, and said sealing surface providing a radial seal with said outer surface of said top plate attachment member.

19. A fluid filter assembly, as set forth in claim 1, including a drain plug attached on said closed end of said cylindrical housing.

20. A fluid filter assembly, as set forth in claim 1, wherein said cylindrical housing is deep drawn and spun from stainless steel.

21. A fluid filter assembly, as set forth in claim 20, wherein said cylindrical housing has a first wall portion and a second wall portion, said first wall portion originating from the open end of said housing and extending for an axial length no greater than about 50 mm, said first wall portion having a thickness in the range of about 3 mm to about 4 mm and said second wall portion having a thickness in the range of about 1 mm to about 2 mm.

22. A fluid filter assembly, as, set forth in claim 1, wherein said cylindrical housing has a first wall portion and a second wall portion, said first wall portion originating from the open end of said housing and extending for an axial length no greater than about one-third the outer diameter of said cylindrical housing.

23. A fluid filter assembly, as set forth in claim 22, wherein a thickness of said first wall portion is at least 50% greater than a thickness of said second wall portion.

* * * * *